US010902373B2

(12) United States Patent
Deshpande et al.

(10) Patent No.: US 10,902,373 B2
(45) Date of Patent: Jan. 26, 2021

(54) SYSTEM, METHOD AND COMPUTER PROGRAM PRODUCT FOR ORDER FULFILLMENT IN RETAIL SUPPLY NETWORKS

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Alan J. King, South Salem, NY (US); Ali Koc, White Plains, NY (US); Yingjie Li, Chappaqua, NY (US); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US); Xiaobo Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 15/154,249

(22) Filed: May 13, 2016

(65) Prior Publication Data
US 2017/0206541 A1 Jul. 20, 2017

Related U.S. Application Data

(60) Provisional application No. 62/279,738, filed on Jan. 16, 2016.

(51) Int. Cl.
*G06Q 30/00* (2012.01)
*G06Q 10/08* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC ................. G06Q 10/8345; G06F 16/1844
(Continued)

(56) References Cited

U.S. PATENT DOCUMENTS 7,092,929 B1 * 8/2006 Dvorak ................ G06Q 10/087
705/28
8,352,382 B1 1/2013 Katta et al.
(Continued)

OTHER PUBLICATIONS

Acimovic, J.A. et al., "Lowering Outbound Shipping Costs in an Online Retail Environment by Making Better Fulfillment and Replenishment Decisions", MIT PhD Thesis, (Aug. 2012), Downloaded from http://web.mit.edu/sgraves/www/papers/Acimovic%20Thesis%20Final%202012-08-01.pdf on Aug. 12, 2014, 198 pages.
(Continued)

*Primary Examiner* — David J Stoltenberg
*Assistant Examiner* — Michael I Ezewoko
(74) *Attorney, Agent, or Firm* — Scully, Scott, Murphy & Presser, PC; Joseph Petrokaitis, Esq.

(57) ABSTRACT

The present disclosure relates generally to the field of retail supply networks. In one specific example, mechanisms are provided to model markdown-avoidance savings for omni-channel fulfillment in retail supply networks. In various embodiments, systems, methods and computer program products are provided.

20 Claims, 9 Drawing Sheets (51) Int. Cl.
    *G06Q 30/02*     (2012.01)
    *G06N 20/00*     (2019.01)
    *G06F 16/14*     (2019.01)
    *G06F 16/182*     (2019.01)
    *G06F 16/17*     (2019.01)
    *G06F 16/23*     (2019.01)
    *G06N 5/00*     (2006.01)
    *G06F 3/0482*     (2013.01)
    *G06F 3/0484*     (2013.01)
    *G06Q 30/06*     (2012.01)
    *H04L 12/26*     (2006.01)
    *G06N 5/04*     (2006.01)
    *G06Q 10/06*     (2012.01)

(52) U.S. Cl.
    CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
    USPC ........................................................ 705/7.31
    See application file for complete search history.

(56) References Cited

U.S. PATENT DOCUMENTS

| | | | |
|---|---|---|---|
| 8,374,922 B1 | 2/2013 | Antony | |
| 8,639,558 B2 * | 1/2014 | Desai | ..................... G06Q 30/02 |
| | | | 705/7.29 |
| 8,812,338 B2 * | 8/2014 | Pratt | ..................... G05B 15/02 |
| | | | 705/7.25 |
| 8,818,836 B1 | 8/2014 | Braumoeller et al. | |
| 2012/0150583 A1 | 6/2012 | Dueck et al. | |
| 2012/0150692 A1 | 6/2012 | Dueck et al. | |
| 2013/0166468 A1 | 6/2013 | Vogelgesang et al. | |
| 2014/0089147 A1 | 3/2014 | Herndon | |

OTHER PUBLICATIONS

NIST, "NIST Cloud Computing Program", http://csrc.nist.gov/groups/SNS/cloud-computing/index.html,Created on Nov. 15, 2010, Last updated on Mar. 2, 2016, 2 pages.
"Omnichanell Inventory Optimization: Where Are My Products?", www.ParkerAvery.com, (Sep. 30, 2013) 10 pages.

* cited by examiner

```
┌─────────────────────────────────────────────────────────────┐
│ OBTAINING BY A COMPUTER, FOR THE PRODUCT, INVENTORY DATA    │
│ INDICATIVE OF A SUPPLY OF THE PRODUCT FOR A PROJECTED       │
│ PERIOD OF TIME AT EACH OF THE POTENTIAL NODES               │
│                          501                                 │
└─────────────────────────────────────────────────────────────┘
                              ↓
┌─────────────────────────────────────────────────────────────┐
│ OBTAINING BY THE COMPUTER, FOR THE PRODUCT, MARKDOWN        │
│ IMPLEMENTATION DATA INDICATIVE OF A PLANNED TIME WHEN THE   │
│ PRODUCT PRICE WILL BE MARKED DOWN AT EACH OF THE            │
│ POTENTIAL NODES                                              │
│                          503                                 │
└─────────────────────────────────────────────────────────────┘
                              ↓
┌─────────────────────────────────────────────────────────────┐
│ OBTAINING BY THE COMPUTER, FOR THE PRODUCT, EXISTING PRICE  │
│ DATA INDICATIVE OF AN EXISTING PRICE OF THE PRODUCT AT EACH │
│ OF THE POTENTIAL NODES                                       │
│                          505                                 │
└─────────────────────────────────────────────────────────────┘
                              ↓
┌─────────────────────────────────────────────────────────────┐
│ OBTAINING BY THE COMPUTER, FOR THE MARKDOWN RATE DATA       │
│ INDICATIVE OF A MARKDOWN RATE TO BE APPLIED TO THE PRODUCT  │
│ AT EACH OF THE POTENTIAL NODES                              │
│                          507                                 │
└─────────────────────────────────────────────────────────────┘
                              ↓
┌─────────────────────────────────────────────────────────────┐
│ OBTAINING BY THE COMPUTER, TIME DATA INDICATIVE OF A CURRENT TIME │
│                          509                                 │
└─────────────────────────────────────────────────────────────┘
                              ↓
┌─────────────────────────────────────────────────────────────┐
│ EXECUTING BY THE COMPUTER, FOR THE PRODUCT, A CALCULATING   │
│ PROCESS TO CALCULATE A MARKDOWN-AVOIDANCE SAVINGS AT EACH   │
│ OF THE POTENTIAL NODES, THE MARKDOWN-AVOIDANCE SAVINGS      │
│ BEING CALCULATED BASED UPON AT LEAST THE INVENTORY DATA,    │
│ THE MARKDOWN IMPLEMENTATION DATA, THE EXISTING PRICE DATA   │
│ AND THE TIME DATA                                            │
│                          511                                 │
└─────────────────────────────────────────────────────────────┘
                              ↓
                      ( To FIG. 5B )
```

SYSTEM, METHOD AND COMPUTER PROGRAM PRODUCT FOR ORDER FULFILLMENT IN RETAIL SUPPLY NETWORKS

CROSS REFERENCE TO RELATED APPLICATION

This application claims the benefit of U.S. Provisional Patent Application No. 62/279,738, filed Jan. 16, 2016, the entire content and disclosure of which is incorporated herein by reference.

BACKGROUND

The present disclosure relates generally to the field of retail supply networks. In one specific example, mechanisms are provided to model markdown-avoidance savings for omni-channel order fulfillment in retail supply networks. In various embodiments, systems, methods and computer program products are provided.

Typically, unsold seasonal inventory in stores is marked down at a significantly lower price towards the end of the season (so that the inventory is sold before the beginning of the new season). With a markdown, a retailer typically either incurs losses or, if not, at least loses a portion of a potential profit.

Figure 1A:
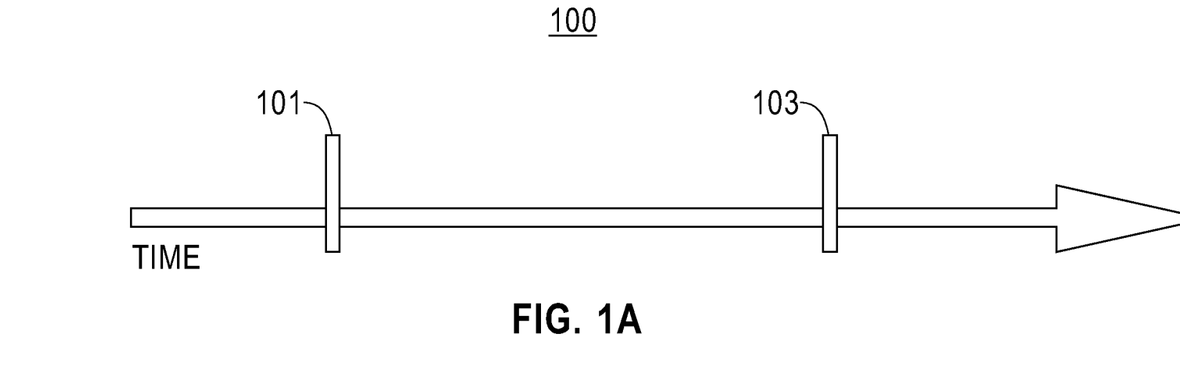
FIG. 1A depicts a timeline of a conventional markdown decision/implementation process and FIG. 1B depicts a timeline of a conventional markdown decision/implementation process.

As seen in FIG. 1A, a timeline 100 is depicted showing that a decision 101 to make such a markdown is typically made at least a few weeks in advance before the actual implementation 103 of the markdown. Once an item is marked down for clearance or marked down at a significantly lower price, the item is typically not used for an online order fulfillment.

Figure 1B:
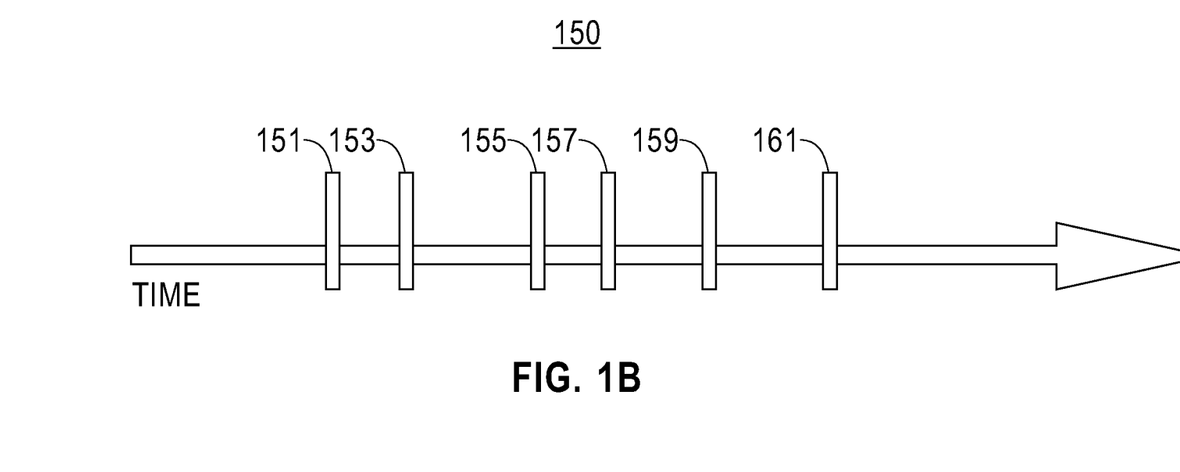

Further, as seen in FIG. 1B, a timeline 150 is depicted showing multiple markdowns. That is, a decision 151 to make a first markdown is made in advance of the actual implementation 153 of the first markdown. In addition, a decision 155 to make a second markdown is made in advance of the actual implementation 157 of the second markdown (the decision for the second markdown may be made before or after the decision and/or implementation of the first markdown). Moreover, a decision 159 to make a third markdown is made in advance of the actual implementation 161 of the third markdown (the decision for the third markdown may be made before or after the decision and/or implementation of the second markdown). In other examples, any number of markdowns may be implemented (with any desired time span between a given decision/implementation and any desired time span between each markdown).

In a conventional process, eligible "nodes" for fulfillment are typically selected based on inventory availability above certain thresholds. There is no fulfillment preference for those nodes where the inventory is slated for markdown and potential gains from selling at a price higher than the markdown price are not taken into account for fulfillment decision.

SUMMARY

Product fulfillment decisions may incorporate data determined from the modeling of markdown-avoidance savings (in order to optimize profitability).

In one embodiment, a computer-implemented method for selecting, for order fulfillment of a product, at least one eligible node from among a plurality of potential nodes, is provided, the method comprising: obtaining by a computer, for the product, inventory data indicative of a supply of the product for a projected period of time at each of the potential nodes; obtaining by the computer, for the product, markdown implementation data indicative of a planned time when the product price will be marked down at each of the potential nodes; obtaining by the computer, for the product, existing price data indicative of an existing price of the product at each of the potential nodes; obtaining by the computer, for the product, markdown rate data indicative of a markdown rate to be applied to the product at each of the potential nodes; obtaining, by the computer, time data indicative of a current time; executing by the computer, for the product, a calculating process to calculate a markdown-avoidance savings at each of the potential nodes, the markdown-avoidance savings being calculated based upon at least the inventory data, the markdown implementation data, the existing price data, and the time data; and executing by the computer a selecting process to select, from among the plurality of potential nodes, the at least one eligible node for order fulfillment, the at least one eligible node for order fulfillment being selected based at least in part upon the calculated markdown-avoidance savings.

In another embodiment, a computer readable storage medium, tangibly embodying a program of instructions executable by a computer for selecting, for order fulfillment of a product, at least one eligible node from among a plurality of potential nodes, is provided, the program of instructions, when executing, performing the following steps: obtaining, for the product, inventory data indicative of a supply of the product for a projected period of time at each of the potential nodes; obtaining, for the product, markdown implementation data indicative of a planned time when the product price will be marked down at each of the potential nodes; obtaining, for the product, existing price data indicative of an existing price of the product at each of the potential nodes; obtaining, for the product, markdown rate data indicative of a markdown rate to be applied to the product at each of the potential nodes; obtaining time data indicative of a current time; executing a calculating process to calculate, for the product, a markdown-avoidance savings at each of the potential nodes, the markdown-avoidance savings being calculated based upon at least the inventory data, the markdown implementation data, the existing price data, and the time data; and executing a selecting process to select, from among the plurality of potential nodes, the at least one eligible node for order fulfillment, the at least one eligible node for order fulfillment being selected based at least in part upon the calculated markdown-avoidance savings.

In another embodiment, a computer-implemented system for selecting, for order fulfillment of a product, at least one eligible node from among a plurality of potential nodes, is provided, the system comprising: a processor; and a memory storing computer readable instructions that, when executed by the processor, implement: obtaining, for the product, inventory data indicative of a supply of the product for a projected period of time at each of the potential nodes; obtaining, for the product, markdown implementation data indicative of a planned time when the product price will be marked down at each of the potential nodes; obtaining, for the product, existing price data indicative of an existing price of the product at each of the potential nodes; obtaining, for the product, markdown rate data indicative of a markdown rate to be applied to the product at each of the potential nodes; obtaining time data indicative of a current time; executing a calculating process to calculate, for the product, a markdown-avoidance savings at each of the potential nodes, the markdown-avoidance savings being calculated based upon at least the inventory data, the markdown implementation data, the existing price data, and the time data; and executing a selecting process to select, from among the plurality of potential nodes, the at least one eligible node for order fulfillment, the at least one eligible node for order fulfillment being selected based at least in part upon the calculated markdown-avoidance savings.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may be provided to model markdown-avoidance savings for omni-channel fulfillment in retail supply networks. In another example, one or more methods may be provided to model markdown-avoidance savings for omni-channel fulfillment in retail supply networks. In another example, one or more computer program products (including one or more algorithms) may be provided to model markdown-avoidance savings for omni-channel fulfillment in retail supply networks.

For the purposes of describing and claiming the present invention the term "node" is intended to refer to a computer representation of a source of product distribution associated with a given enterprise. Such a node may be, for example, a retail store, a warehouse, a distribution center ("DC") or an electronic fulfillment center ("EFC").

For the purposes of describing and claiming the present invention the term "omni-channel fulfillment" is intended to refer to fulfillment of an order for a product via at least one of a plurality of possible channels (e.g., in store, online, catalog).

For the purposes of describing and claiming the present invention the term "enterprise" is intended to refer to a given organization (such as, for example, a corporation).

For the purposes of describing and claiming the present invention the term "enterprise server system" is intended to refer to one or more computers (e.g., one or more server computers) operated by an enterprise (for example, in connection with carrying out sales of a product).

For the purposes of describing and claiming the present invention the term "SKU" (or stock keeping unit) is intended to refer to an identification, typically alphanumeric, of a particular product that allows the product to be tracked for inventory purposes.

For the purposes of describing and claiming the present invention the term "real-time" (such as used in the context of "real-time data") is intended to refer to occurring substantially contemporaneously with an event (but not necessarily at precisely the exact same time).

Figure 2:
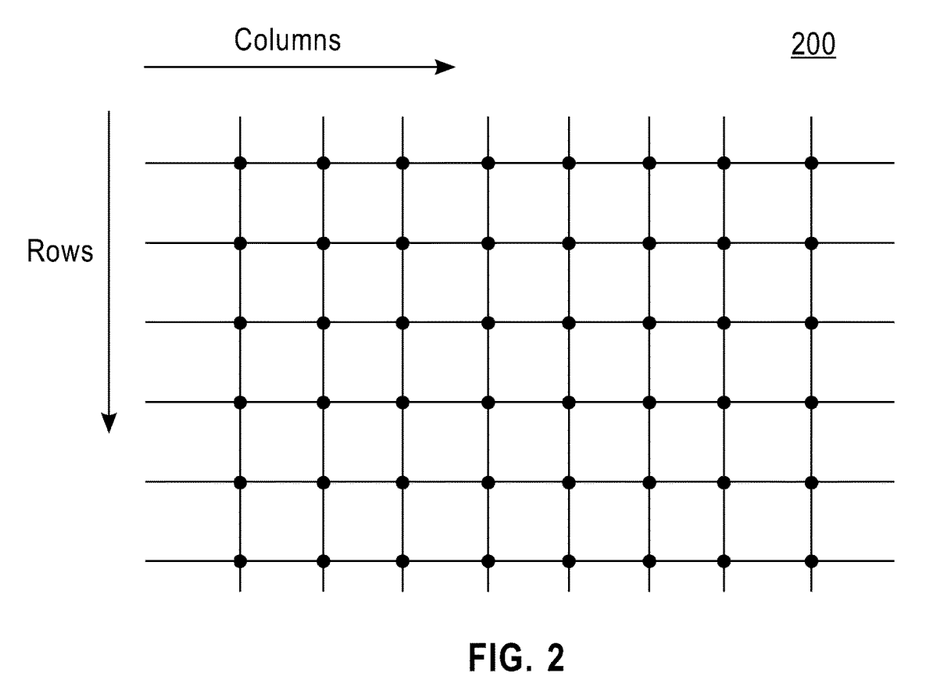
FIG. 2 depicts a block diagram of a computer representation of a plurality of "nodes" according to an embodiment of the disclosure.

Referring now to FIG. 2, various nodes for order fulfillment according to an embodiment of the disclosure may be represented in a computer as an array 200 of rows and columns. Each node in this example is shown as a dot located at an intersection of a given row and a given column. In this manner each node may be identified by a row/column index. This implementation is, of course, only one example of how nodes for order fulfillment may be represented in a computer.

As described herein, mechanisms are provided wherein eligible node(s) for fulfillment are selected based on inventory availability and potential markdown-avoidance savings (in other words, gains from selling a product at a price higher than the markdown price).

Markdown-avoidance savings are modeled in such a way that node(s) with a product slated for markdown are preferred for order fulfillment over other node(s). Additionally, markdown-avoidance savings may be modeled taking into account the time period from the markdown decision to the markdown implementation. The closer the current time is to the markdown decision, the higher the priority given to the store inventory for store sales. On the other hand, the closer the current time is to the markdown implementation, the higher the priority given to eligibility (of all nodes) for online order fulfillment.

Figure 3:
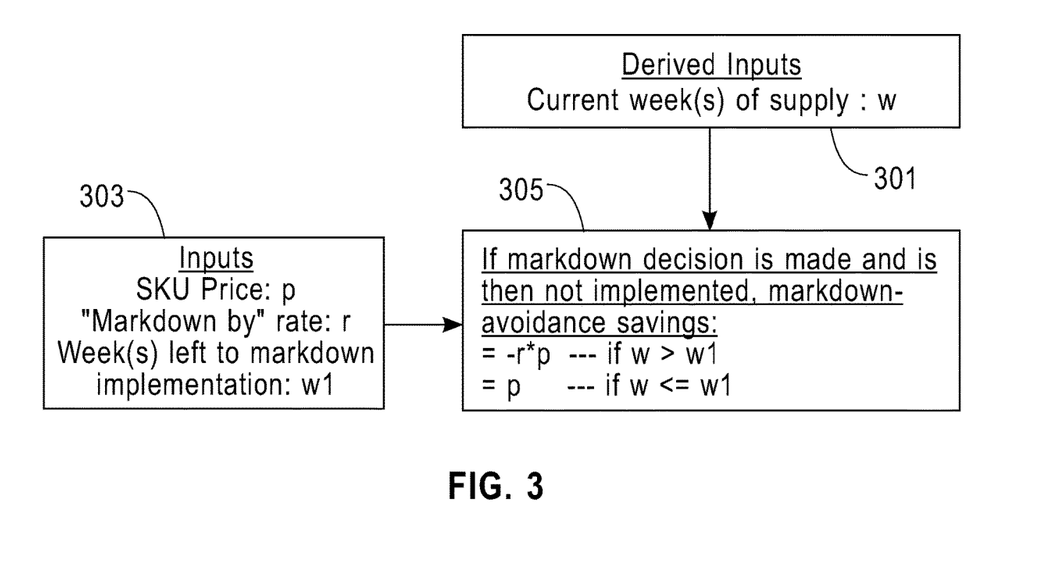
FIG. 3 depicts a block diagram of a markdown-avoidance savings determination process according to one example implementation of an embodiment of the disclosure.

Referring now to FIG. 3, shown is a block diagram of a markdown-avoidance savings determination process according to one example implementation of an embodiment of the disclosure. In this example, markdown-avoidance savings is modeled in terms of dollars (of course, in other examples, markdown-avoidance savings may be modeled using any desired currency). Further in this example, markdown-avoidance savings are modeled using a time period of week (of course, in other examples, markdown-avoidance savings may be modeled using any desired time periods (e.g., days, weeks, months, quarters)). Further still, in this example, markdown-avoidance savings are modeled using SKU as a product identifier (of course, in other examples, markdown-avoidance savings may be modeled using any desired product identifier).

Still referring to FIG. 3, it is noted that in this example the markdown-avoidance savings is determined for each SKU-node pair where the SKU is planned for markdown at the node. More particularly, markdown-avoidance savings for each node is determined using as a derived input 301 the current week(s) of supply of the SKU at each node (represented here as "w"). In addition, markdown-avoidance savings is determined for each node using as other inputs 303 the following: (a) the SKU price (represented here as "p"); (b) the markdown by rate, that is, the percentage markdown, (represented here as "r"); and (c) the number of week(s) remaining between the current time and the planned markdown implementation (represented here as "w1"). In another example, instead of calculating based upon weeks, calculations may be carried out based upon days.

Still referring to FIG. 3, as shown in block 305, modeling of a markdown-avoidance savings in a situation where a markdown decision is made and is then not implemented is described for each of two cases as follows. More particularly, if current week(s) of supply (that is, w) is less than or equal to week(s) remaining until markdown (that is, w1), then assign the markdown-avoidance savings a value of p—i.e., no markdown-avoidance savings (in this case, the node is penalized for missing a potential store sale). On the other hand, if current week(s) of supply (that is, w) is greater than week(s) remaining until to markdown (that is, w1), then assign the markdown-avoidance savings a value of $(-r) \times (p)$. In this latter case, a store, for example, has excess inventory and should be used for online order fulfillment. Of note, the markdown-avoidance savings in this example are modeled as fulfillment associated cost, hence the negative (−) sign on the savings. Additionally, it could be possible for a user to specify a certain weighting factor (or degree of belief) to the markdown-avoidance savings, in which case the above savings are multiplied by the weighting factor.

Reference will now be made to an example implementation directed to calculating week(s) of supply w for a given SKU-node pair. In this example, $w=[I+R]/z$, where I=on-hand inventory, R=expected incoming inventory as receipts, and z=predicted average sales (e.g., predicted average weekly sales). In various specific examples, w is computed daily or weekly or in real-time as the inventory updates with sales.

Figure 4:
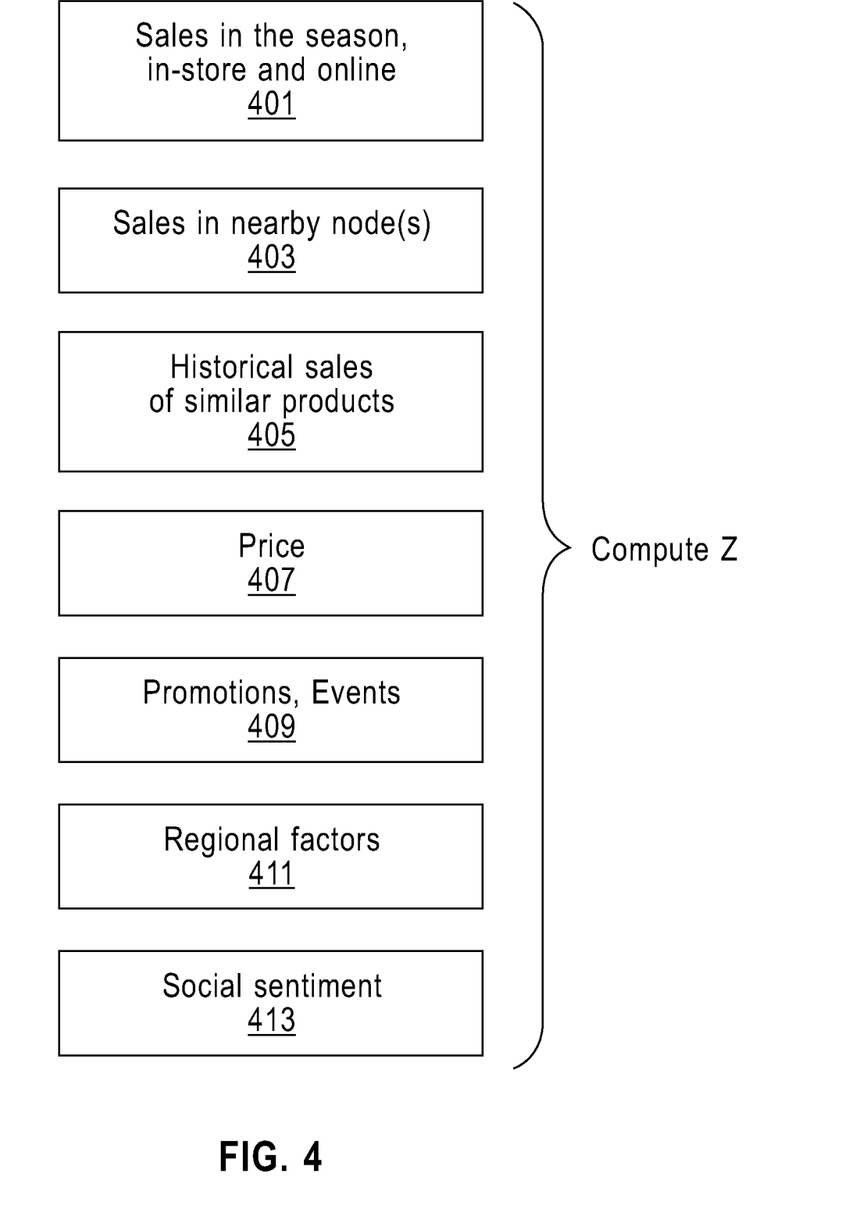
FIG. 4 depicts a block diagram of factors relating to computation of predicted average sales over a given period according to an embodiment of the disclosure.

Referring now to FIG. 4, example inputs 401, 403, 405, 407, 409, 411 and 413 are shown which may be used to calculate z (that is, predicted average sales). Of course, any one or more of these inputs may be used, as desired. In various specific examples, z may be calculated as follows: (I) z can be calculated as past average weekly store sales over some time window if sales are not too varying; (II) z can be calculated as past average weekly store sales over nodes in a certain region if the sales are not too varying; and/or (III) in a more sophisticated model, a demand forecasting approach may be used which may leverage: (a) historical sales patterns of the same or a similar product through the season; (b) price and current promotions; (c) recent sales pattern(s); (d) upcoming events and promotions; (e) social media sentiment about the product; and/or (f) other regional factors such as weather or local events.

Reference will now be made to various computation examples in the case that two or more nodes have the same markdown-avoidance savings per unit (that is, per SKU-node pair). In one specific example, nodes can be ranked based on the actual number of units remaining (e.g., the node having 100 units remaining could be preferred over the node with 50 units remaining).

In another example, the markdown-avoidance savings function itself can take into account the actual number of units remaining. In this example, the insignificant decimals can indicate priority as follows:

Node 1 (e.g., 100 units remaining) and node 2 (50 units remaining)—both nodes have excess inventory with each node having markdown-avoidance savings per unit equal to $−5.00. Additional units remaining can be incorporated in the per unit cost as:
Node 1: $-5-(0.01)/100=-5.0001$
Node 2: $-5-(0.01)/50=-5.005$ In another example, nodes that are close (in time) to the markdown implementation date are preferred over nodes that are far away (in time). This can also be modeled in the cost function as above, where weeks (or any other desired time period) remaining until markdown implementation are taken into account.

In another example, instead of (or in addition to) computing markdown-avoidance savings at the SKU-node level, there might be a need to go up the product hierarchy level and/or zone hierarchy level (e.g., in the case that the data at the SKU-node level is too sparse). In this example, the information could be aggregated at the upper hierarchy (product and/or zone) level. For example, instead of SKU, a "Style" or product sub-class may be used. In another example, instead of a single node, a collection of nodes in geographic proximity may be used.

Figure 5A:
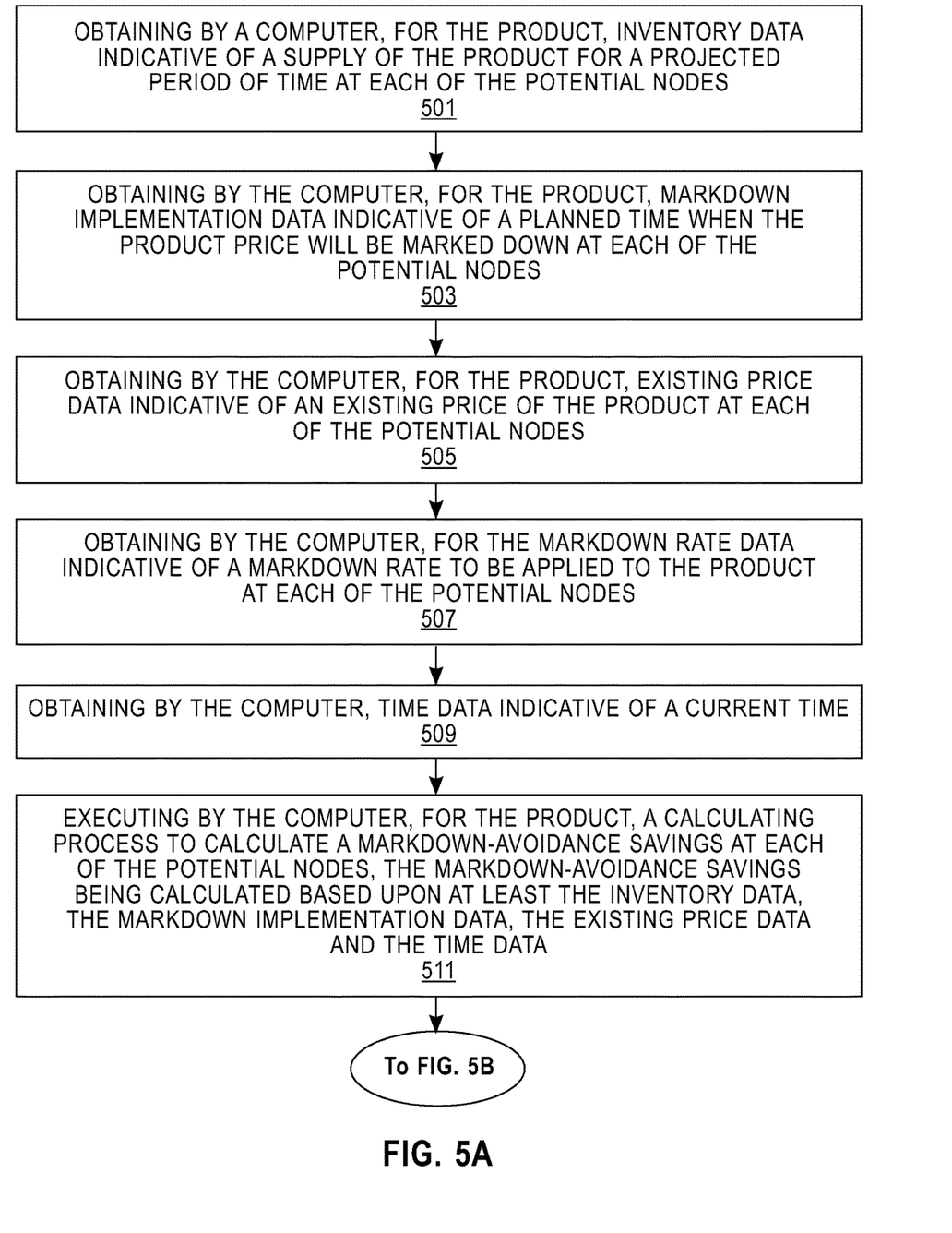
FIGS. 5A and 5B depict a flowchart of a method according to an embodiment.
Figure 5B:
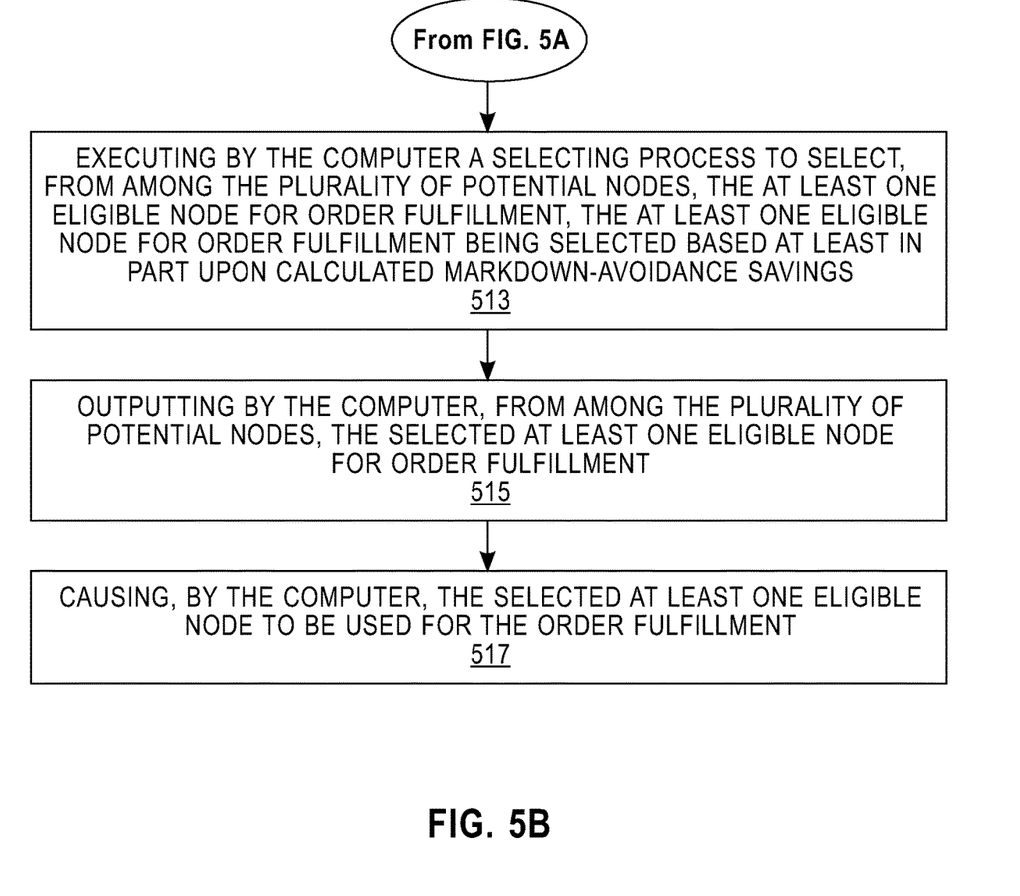

Referring now to FIGS. 5A and 5B, a method for selecting, for order fulfillment of a product, at least one eligible node from among a plurality of potential nodes is provided. As seen in these FIGS. 5A and 5B, the method of this embodiment comprises: at 501—obtaining by a computer, for the product, inventory data indicative of a supply of the product for a projected period of time at each of the potential nodes; at 503—obtaining by the computer, for the product, markdown implementation data indicative of a planned time when the product price will be marked down at each of the potential nodes; at 505—obtaining by the computer, for the product, existing price data indicative of an existing price of the product at each of the potential nodes; at 507—obtaining by the computer, for the product, markdown rate data indicative of a markdown rate to be applied to the product at each of the potential nodes; at 509—obtaining, by the computer, time data indicative of a current time; at 511—executing by the computer, for the product, a calculating process to calculate a markdown-avoidance savings at each of the potential nodes, the markdown-avoidance savings being calculated based upon at least the inventory data, the markdown implementation data, the existing price data, and the time data; at 513—executing by the computer a selecting process to select, from among the plurality of potential nodes, the at least one eligible node for order fulfillment, the at least one eligible node for order fulfillment being selected based at least in part upon calculated markdown-avoidance savings; at 515—outputting by the processor, from among the plurality of potential nodes, the selected at least one eligible node for order fulfillment; and at 517—causing, by the processor, the selected at least one eligible node to be used for the order fulfillment.

In one example, the existing price data is non-markdown price data indicative of a non-markdown price. In another example, the existing price data is previous markdown price data indicative of a previous markdown price.

In another example, the inventory data for each node may be obtained by the computer (using communication via a network) from each node. In another example, the inventory data for each node may be obtained by the computer (using communication via a network) from a central database. In another example, the markdown implementation data for each node may be obtained by the computer (using communication via a network) from each node. In another example, the markdown implementation data for each node may be obtained by the computer (using communication via a network) from a central database. In another example, the existing price data for each node may be obtained by the computer (using communication via a network) from each node. In another example, the existing price data for each node may be obtained by the computer (using communication via a network) from a central database. In another example, the markdown rate data for each node may be obtained by the computer (using communication via a network) from each node. In another example, the markdown rate data for each node may be obtained by the computer (using communication via a network) from a central database.

Figure 6:
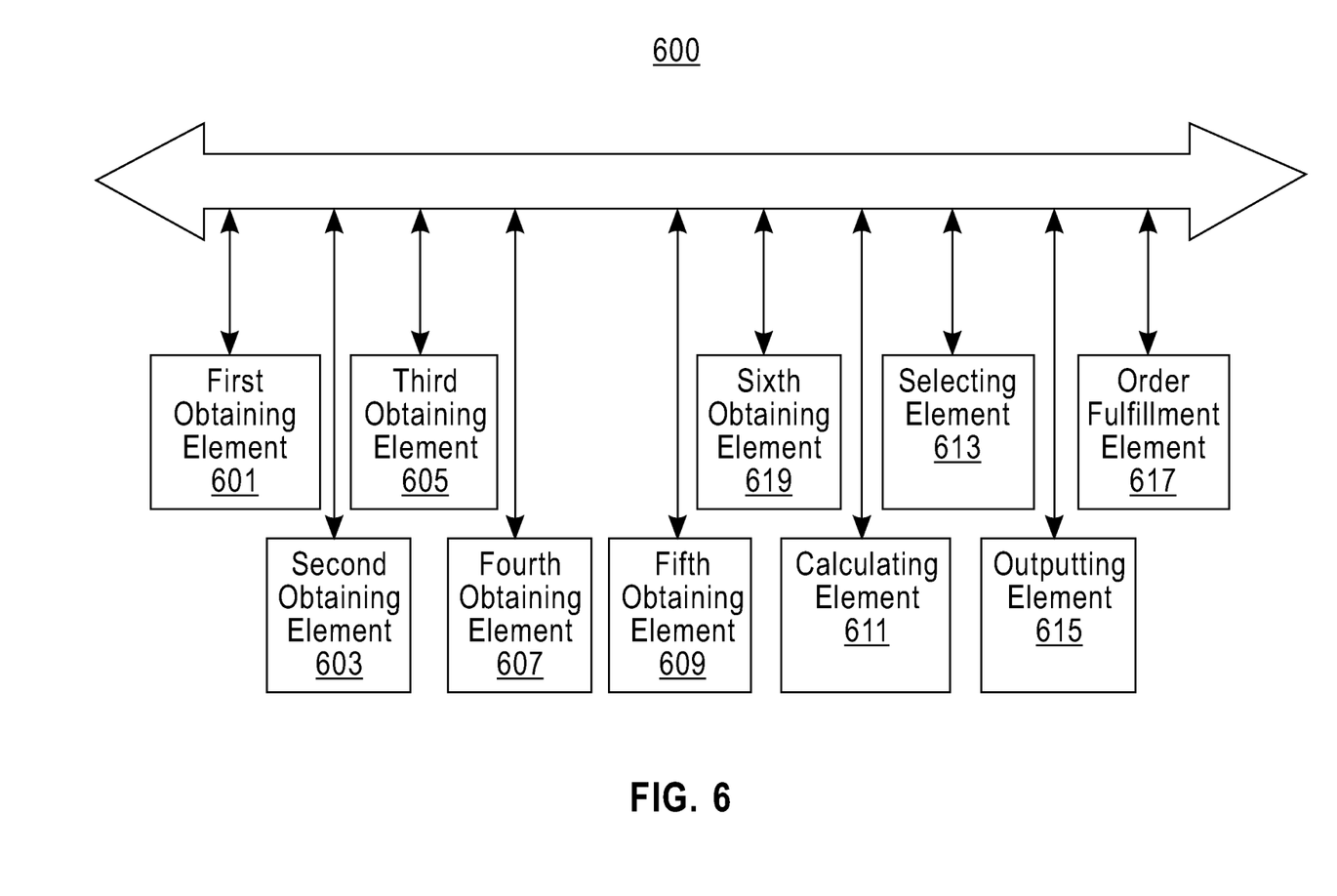
FIG. 6 depicts a block diagram of a system according to an embodiment.

Referring now to FIG. 6, in another embodiment, a system 600 for selecting, for order fulfillment of a product, at least one eligible node from among a plurality of potential nodes is provided. This system may include a processor (not shown); and a memory (not shown) storing computer readable instructions that, when executed by the processor, implement: a first obtaining element 601 configured to obtain, for the product, inventory data indicative of a supply of the product for a projected period of time at each of the potential nodes; a second obtaining element 603 configured to obtain, for the product, markdown implementation data indicative of a planned time when the product price will be marked down at each of the potential nodes; a third obtaining element 605 configured to obtain, for the product, existing price data indicative of an existing price of the product at each of the potential nodes; a fourth obtaining element 607 configured to obtain, for the product, markdown rate data indicative of a markdown rate to be applied to the product at each of the potential nodes; a fifth obtaining element 609 configured to obtain time data indicative of a current time; a calculating element 611 configured to calculate, for the product, a markdown-avoidance savings at each of the potential nodes, the markdown-avoidance savings being calculated based upon at least the inventory data, the markdown implementation data, the existing price data, and the time data; a selecting element 613 configured to select, from among the plurality of potential nodes, the at least one eligible node for order fulfillment, the at least one eligible node for order fulfillment being selected based at least in part upon calculated markdown-avoidance savings; an outputting element 615 configured to output by the processor, from among the plurality of potential nodes, the selected at least one eligible node for order fulfillment; an order fulfillment element 617 configured to cause the at least one eligible node to be used for the order fulfillment; and a sixth obtaining element 619 configured to obtain a weighting factor from a user, the weighting factor being indicative of a degree of belief of the user with respect to the markdown-avoidance savings, wherein the calculated markdown-avoidance savings are multiplied by the weighting factor to affect the selection of the at least one eligible node.

In one example, communication between and among the various components of FIG. 6 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 7.

Figure 7:
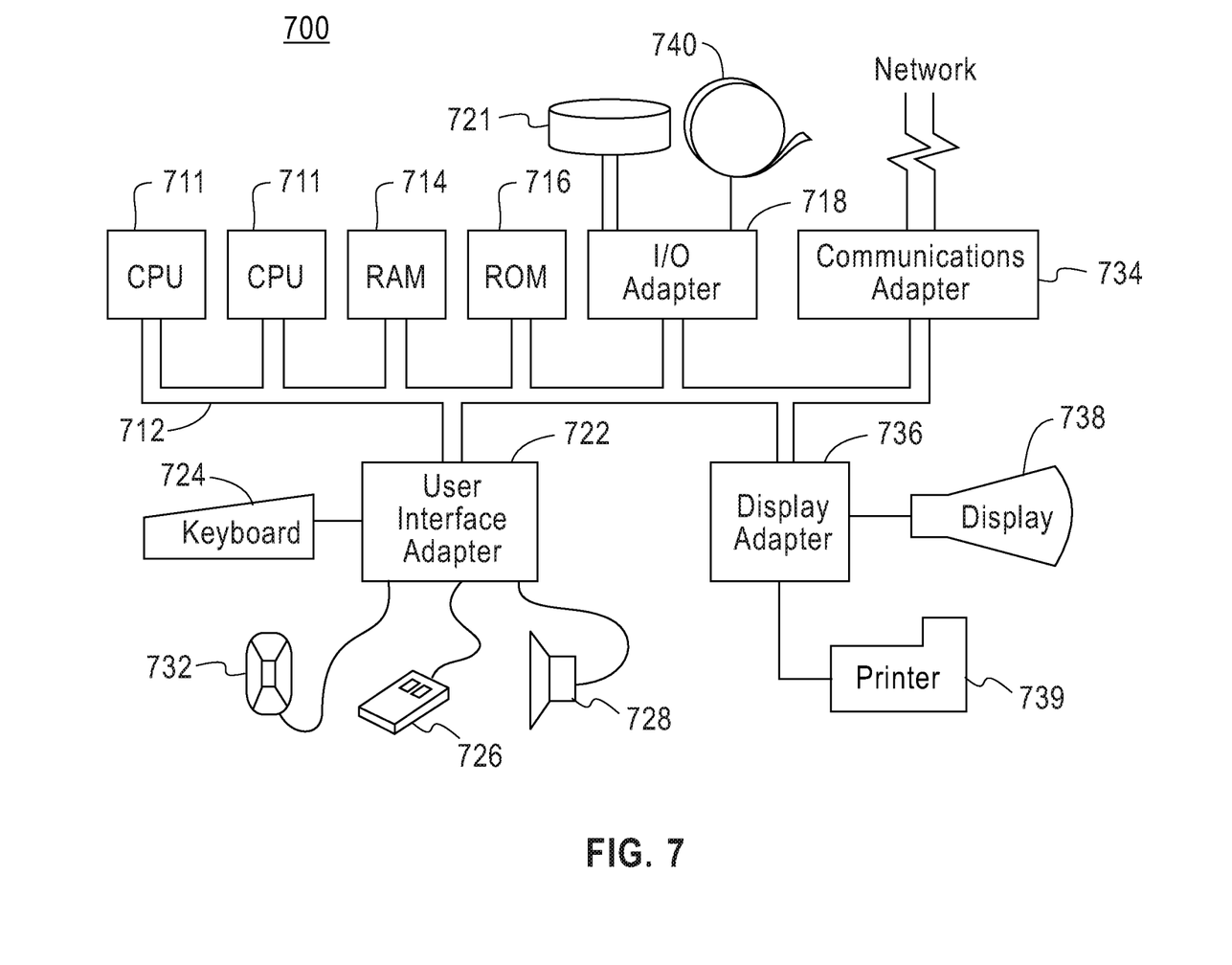
FIG. 7 depicts a block diagram of a system according to an embodiment.

Referring now to FIG. 7, this figure shows a hardware configuration of computing system 700 according to an embodiment of the present invention. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

In one example, system 700 of FIG. 7 may be operated by an enterprise. In one specific example, system 700 of FIG. 7 may comprise an enterprise server system.

As described herein, mechanisms are provided for use in connection with order fulfillment (e.g., retail, catalog, ship from store, buy online pick up in store); inventory management; and markdown-avoidance savings.

In one embodiment, a computer-implemented method for selecting, for order fulfillment of a product, at least one eligible node from among a plurality of potential nodes, is provided, the method comprising: obtaining by a computer, for the product, inventory data indicative of a supply of the product for a projected period of time at each of the potential nodes; obtaining by the computer, for the product, markdown implementation data indicative of a planned time when the product price will be marked down at each of the potential nodes; obtaining by the computer, for the product, existing price data indicative of an existing price of the product at each of the potential nodes; obtaining by the computer, for the product, markdown rate data indicative of a markdown rate to be applied to the product at each of the potential nodes; obtaining, by the computer, time data indicative of a current time; executing by the computer, for the product, a calculating process to calculate a markdown-avoidance savings at each of the potential nodes, the markdown-avoidance savings being calculated based upon at least the inventory data, the markdown implementation data, the existing price data, and the time data; and executing by the computer a selecting process to select, from among the plurality of potential nodes, the at least one eligible node for order fulfillment, the at least one eligible node for order fulfillment being selected based at least in part upon the calculated markdown-avoidance savings.

In one example, the existing price data is non-markdown price data indicative of a non-markdown price.

In another example, the existing price data is previous markdown price data indicative of a previous markdown price.

In another example, the method further comprises causing, by the computer, the at least one eligible node to be used for the order fulfillment.

In another example, the projected period of time is represented in a form selected from the group comprising: (a) number of months; (b) number of weeks; and (c) number of days.

In another example, the planned time when the product price will be marked down is a date determined by a markdown decision.

In another example, the current time is in the form of a current date.

In another example: if the projected period of time of supply for a given one of the potential nodes is less than or equal to a lower bound, then the markdown-avoidance savings at the given node is calculated as the existing price of the product; the lower bound being a time period from the current time until the planned time when the product price will be marked down at the given node.

In another example, the markdown rate is a percentage.

In another example: if the projected period of time of supply for a given one of the potential nodes is greater than an upper bound, then the markdown-avoidance savings at the given node is calculated as: (the existing price of the product)×(the markdown rate)×(−1); the upper bound being a time period from the current time until the planned time when the product price will be marked down at the given node.

In another example, the computer determines the supply of the product at each of the potential nodes based upon the inventory data, the determination by the computer utilizing the formula S=(I+R)/z, where I equals on-hand inventory, R equals expected incoming inventory and z equals predicted average sales.

In another example, z equals predicted average weekly sales and S is a supply of the product for a number of weeks.

In another example, in a case that multiple potential nodes have the same markdown-avoidance savings, a resolution of the at least one eligible node to select is based upon one or more of: (a) an inventory level of the product at each of the potential nodes that have the same markdown-avoidance savings; and (b) a proximity, from the current time, to the planned time when the product price will be marked down at each of the potential nodes that have the same markdown-avoidance savings.

In another example, the method further comprises obtaining by the computer a weighting factor from a user, the weighting factor being indicative of a degree of belief of the user with respect to the markdown-avoidance savings, wherein the calculated markdown-avoidance savings are multiplied by the weighting factor to affect the selection of the at least one eligible node.

In another embodiment, a computer readable storage medium, tangibly embodying a program of instructions executable by a computer for selecting, for order fulfillment of a product, at least one eligible node from among a plurality of potential nodes, is provided, the program of instructions, when executing, performing the following steps: obtaining, for the product, inventory data indicative of a supply of the product for a projected period of time at each of the potential nodes; obtaining, for the product, markdown implementation data indicative of a planned time when the product price will be marked down at each of the potential nodes; obtaining, for the product, existing price data indicative of an existing price of the product at each of the potential nodes; obtaining, for the product, markdown rate data indicative of a markdown rate to be applied to the product at each of the potential nodes; obtaining time data indicative of a current time; executing a calculating process to calculate, for the product, a markdown-avoidance savings at each of the potential nodes, the markdown-avoidance savings being calculated based upon at least the inventory data, the markdown implementation data, the existing price data, and the time data; and executing a selecting process to select, from among the plurality of potential nodes, the at least one eligible node for order fulfillment, the at least one eligible node for order fulfillment being selected based at least in part upon the calculated markdown-avoidance savings.

In one example, the program of instructions, when executing, causes the at least one eligible node to be used for the order fulfillment.

In another example, the program of instructions, when executing, determines the supply of the product at each of the potential nodes based upon the inventory data, the determination utilizing the formula S=(I+R)/z, where I equals on-hand inventory, R equals expected incoming inventory and z equals predicted average sales.

In another embodiment, a computer-implemented system for selecting, for order fulfillment of a product, at least one eligible node from among a plurality of potential nodes, is provided, the system comprising: a processor; and a memory storing computer readable instructions that, when executed by the processor, implement: obtaining, for the product, inventory data indicative of a supply of the product for a projected period of time at each of the potential nodes; obtaining, for the product, markdown implementation data indicative of a planned time when the product price will be marked down at each of the potential nodes; obtaining, for the product, existing price data indicative of an existing price of the product at each of the potential nodes; obtaining, for the product, markdown rate data indicative of a markdown rate to be applied to the product at each of the potential nodes; obtaining time data indicative of a current time; executing a calculating process to calculate, for the product, a markdown-avoidance savings at each of the potential nodes, the markdown-avoidance savings being calculated based upon at least the inventory data, the markdown implementation data, the existing price data, and the time data; and executing a selecting process to select, from among the plurality of potential nodes, the at least one eligible node for order fulfillment, the at least one eligible node for order fulfillment being selected based at least in part upon the calculated markdown-avoidance savings.

In one example: if the projected period of time of supply for a given one of the potential nodes is less than or equal to a lower bound, then the markdown-avoidance savings at the given node is calculated as the existing price of the product; the lower bound being a time period from the current time until the planned time when the product price will be marked down at the given node.

In another example: the markdown rate is a percentage; if the projected period of time of supply for a given one of the potential nodes is greater than an upper bound, then the markdown-avoidance savings at the given node is calculated as: (the existing price of the product)×(the markdown rate)×(−1); the upper bound being a time period from the current time until the planned time when the product price will be marked down at the given node.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
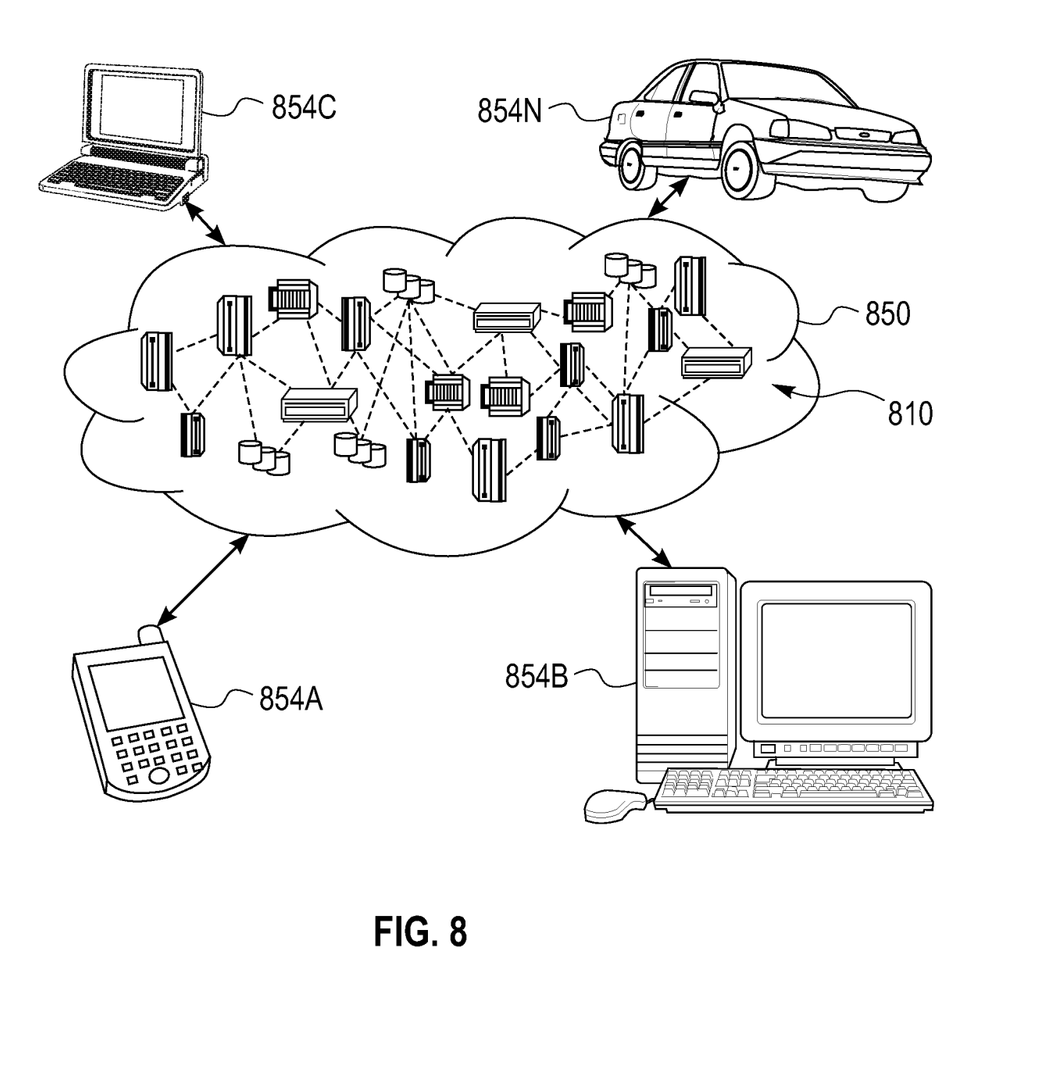
FIG. 8 depicts a cloud computing environment according to an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
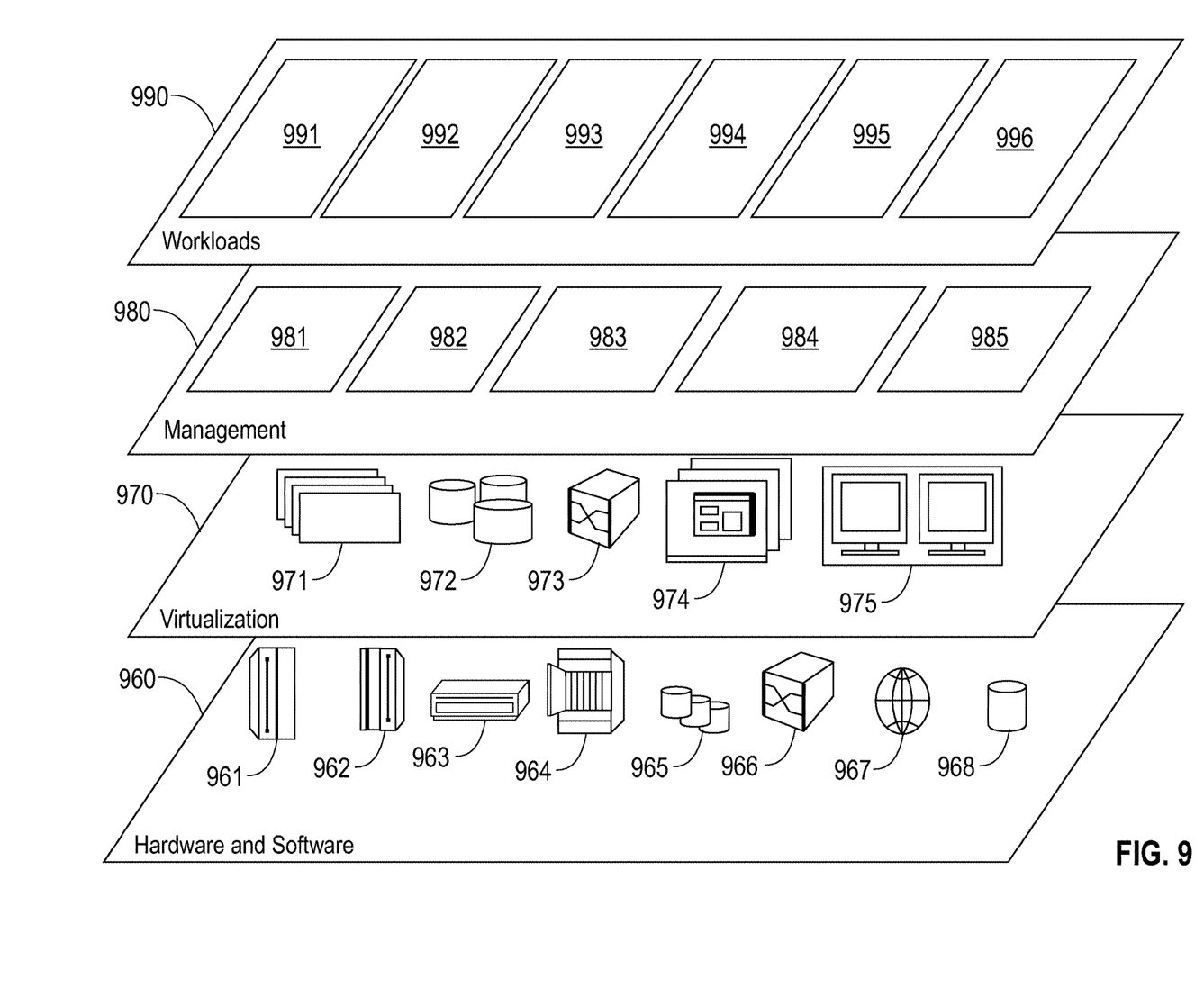
FIG. 9 depicts abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 84 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and modeling of markdown-avoidance savings 996.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for selecting, for order fulfillment of a product, at least one eligible node from among a plurality of potential nodes, the method comprising:
   obtaining by a computer, for the product, inventory data indicative of a supply of the product for a projected period of time at each of the potential nodes;
   obtaining by the computer, for the product, markdown implementation data indicative of a planned time when the product price will be marked down at each of the potential nodes;
   obtaining by the computer, for the product, existing price data indicative of an existing price of the product at each of the potential nodes;
   obtaining by the computer, for the product, markdown rate data indicative of a markdown rate to be applied to the product at each of the potential nodes;
   obtaining, by the computer, time data indicative of a current time;
   inputting the inventory data, the markdown implementation data, the existing price data, the markdown rate data and the time data into a markdown-avoidance savings model stored on the computer, the markdown-avoidance savings being modeled such that an eligible node with a product planned for markdown is preferred for order fulfillment over other eligible nodes, the markdown-avoidance savings being further modeled to include a priority, wherein the closer the current time is to the planned markdown implementation time the higher the priority for order fulfillment;
   executing by the computer, for the product, a calculating process using the markdown-avoidance savings model to calculate a markdown-avoidance savings at each of the potential nodes, the markdown-avoidance savings being calculated based upon at least the inventory data, the markdown implementation data, the existing price data, the time data and the time between the current time and the planned markdown implementation time; and
   executing by the computer a selecting process to select, from among the plurality of potential nodes, at least one eligible node for order fulfillment, the selected at least one eligible node for order fulfillment being preferred over other eligible nodes based at least in part upon the calculated markdown-avoidance savings and the priority.

2. The method of claim 1, wherein the existing price data is non-markdown price data indicative of a non-markdown price.

3. The method of claim 1, wherein the existing price data is previous markdown price data indicative of a previous markdown price.

4. The method of claim 1, further comprising causing, by the computer, the at least one eligible node to be used for the order fulfillment.

5. The method of claim 1, wherein the projected period of time is represented in a form selected from the group comprising: (a) number of months; (b) number of weeks; and (c) number of days.

6. The method of claim 1, wherein:
   if the time between the current time and the planned markdown implementation time is greater than the projected period of time of supply for a given one of the potential nodes, then the markdown-avoidance savings at the given node is calculated as the existing price of the product.

7. The method of claim 1, wherein the markdown rate is a percentage.

8. The method of claim 1, wherein:
   if the time between the current time and the planned markdown implementation time is less than the projected period of time of supply for a given one of the potential nodes, then the markdown-avoidance savings at the given node is calculated as: (the existing price of the product)×(the markdown rate)×(−1).

9. The method of claim 1, wherein the computer determines the supply of the product at each of the potential nodes based upon the inventory data, the determination by the computer utilizing the formula $S=(I+R)/z$, where I equals on-hand inventory, R equals expected incoming inventory and z equals predicted average sales.

10. The method of claim 9, wherein z equals predicted average weekly sales and S is a supply of the product for a number of weeks.

11. The method of claim 1, wherein, in a case that multiple potential nodes have the same markdown-avoidance savings, a resolution of the at least one eligible node to select is based upon one or more of: (a) an inventory level of the product at each of the potential nodes that have the same markdown-avoidance savings; and (b) a proximity, from the current time, to the planned time when the product price will be marked down at each of the potential nodes that have the same markdown-avoidance savings.

12. The method of claim 1, further comprising obtaining by the computer a weighting factor from a user, the weighting factor being indicative of a degree of belief of the user with respect to the markdown-avoidance savings, wherein the calculated markdown-avoidance savings are multiplied by the weighting factor to affect the selection of the at least one eligible node.

13. A computer readable storage medium, tangibly embodying a program of instructions executable by a computer for selecting, for order fulfillment of a product, at least one eligible node from among a plurality of potential nodes, the program of instructions, when executing, performing the following steps:
   obtaining, for the product, inventory data indicative of a supply of the product for a projected period of time at each of the potential nodes;
   obtaining, for the product, markdown implementation data indicative of a planned time when the product price will be marked down at each of the potential nodes;
   obtaining, for the product, existing price data indicative of an existing price of the product at each of the potential nodes;
   obtaining, for the product, markdown rate data indicative of a markdown rate to be applied to the product at each of the potential nodes;
   obtaining time data indicative of a current time;
   inputting the inventory data, the markdown implementation data, the existing price data, the markdown rate data and the time data into a markdown-avoidance savings model stored on the computer, the markdown-avoidance savings being modeled such that an eligible node with a product planned for markdown is preferred for order fulfillment over other eligible nodes, the markdown-avoidance savings being further modeled to include a priority, wherein the closer the current time is to the planned markdown implementation time the higher the priority for order fulfillment;

executing a calculating process using the markdown-avoidance savings model to calculate, for the product, a markdown-avoidance savings at each of the potential nodes, the markdown-avoidance savings being calculated based upon at least the inventory data, the markdown implementation data, the existing price data, the time data and the time between the current time and the planned markdown implementation time; and executing a selecting process to select, from among the plurality of potential nodes, at least one eligible node for order fulfillment, the selected at least one eligible node for order fulfillment being preferred over other eligible nodes based at least in part upon the calculated markdown-avoidance savings and the priority.

14. The computer readable storage medium of claim 13, wherein the program of instructions, when executing, causes the at least one eligible node to be used for the order fulfillment.

15. The computer readable storage medium of claim 13, wherein the program of instructions, when executing, determines the supply of the product at each of the potential nodes based upon the inventory data, the determination utilizing the formula $S=(I+R)/z$, where I equals on-hand inventory, R equals expected incoming inventory and z equals predicted average sales.

16. A computer-implemented system for selecting, for order fulfillment of a product, at least one eligible node from among a plurality of potential nodes, the system comprising:
a processor; and
a memory storing computer readable instructions that, when executed by the processor, implement:
obtaining, for the product, inventory data indicative of a supply of the product for a projected period of time at each of the potential nodes;
obtaining, for the product, markdown implementation data indicative of a planned time when the product price will be marked down at each of the potential nodes;
obtaining, for the product, existing price data indicative of an existing price of the product at each of the potential nodes;
obtaining, for the product, markdown rate data indicative of a markdown rate to be applied to the product at each of the potential nodes;
obtaining time data indicative of a current time;
inputting the inventory data, the markdown implementation data, the existing price data, the markdown rate data and the time data into a markdown-avoidance savings model stored on the computer, the markdown-avoidance savings being modeled such that an eligible node with a product planned for markdown is preferred for order fulfillment over other eligible nodes, the markdown-avoidance savings being further modeled to include a priority, wherein the closer the current time is to the planned markdown implementation time the higher the priority for order fulfillment;

executing a calculating process using the markdown-avoidance savings model to calculate, for the product, a markdown-avoidance savings at each of the potential nodes, the markdown-avoidance savings being calculated based upon at least the inventory data, the markdown implementation data, the existing price data, the time data and the time between the current time and the planned markdown implementation time; and executing a selecting process to select, from among the plurality of potential nodes, at least one eligible node for order fulfillment, the selected at least one eligible node for order fulfillment being preferred over other eligible nodes based at least in part upon the calculated markdown-avoidance savings and the priority.

17. The system of claim 16, wherein:
if the time between the current time and the planned markdown implementation time is greater than the projected period of time of supply for a given one of the potential nodes, then the markdown-avoidance savings at the given node is calculated as the existing price of the product.

18. The system of claim 16, wherein:
if the time between the current time and the planned markdown implementation time is less than the projected period of time of supply for a given one of the potential nodes, then the markdown-avoidance savings at the given node is calculated as: (the existing price of the product)×(the markdown rate)×(−1).

19. The computer readable storage medium of claim 13, wherein:
if the time between the current time and the planned markdown implementation time is greater than the projected period of time of supply for a given one of the potential nodes, then the markdown-avoidance savings at the given node is calculated as the existing price of the product.

20. The computer readable storage medium of claim 13, wherein:
if the time between the current time and the planned markdown implementation time is less than the projected period of time of supply for a given one of the potential nodes, then the markdown-avoidance savings at the given node is calculated as: (the existing price of the product)×(the markdown rate)×(−1).

* * * * *